March 4, 1969     J. M. FOLZ     3,431,315
BUTENE-1 PURIFICATION
Filed March 27, 1967
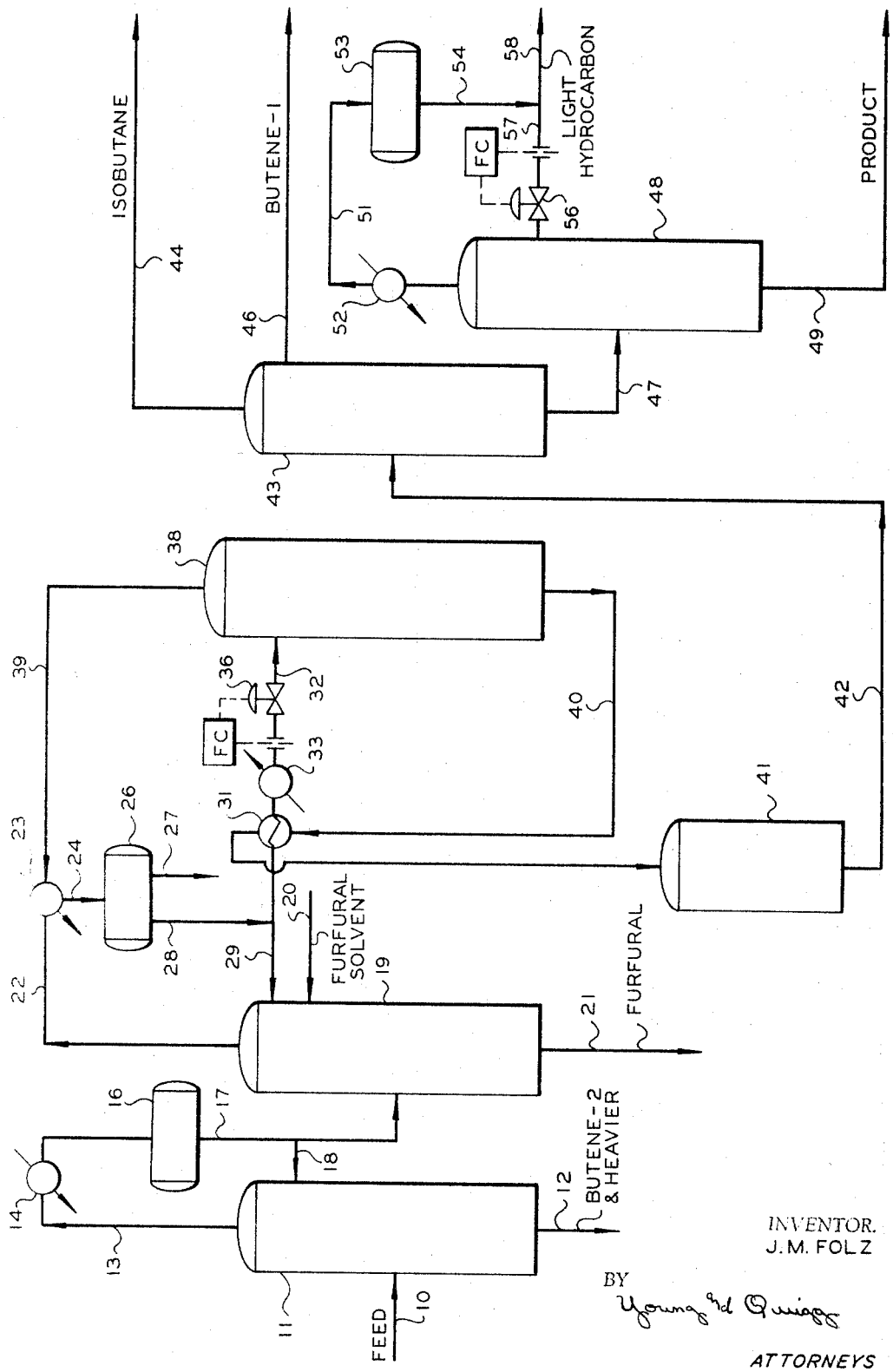
INVENTOR.
J. M. FOLZ
BY
Young and Quigg
ATTORNEYS United States Patent Office 3,431,315
Patented Mar. 4, 1969

3,431,315
BUTENE-1 PURIFICATION
John M. Folz, Bartlesville, Okla., assignor to Phillips Petroleum Company, a corporation of Delaware
Filed Mar. 27, 1967, Ser. No. 626,160
U.S. Cl. 260—677
Int. Cl. C07c *11/02, 3/10*
6 Claims

ABSTRACT OF THE DISCLOSURE

Purification of butene-1 is effected by introducing a feed stream containing impurities such as isobutylene, water and aldehydes into a fractionator wherein the feed stream is fractionated into an overhead product stream and a bottoms product stream. The bottoms product stream is a substantially dry and aldehyde free mixture of butene-1 and isobutylene. The overhead product stream contains substantially all of the aldehydes and water along with butene-1. The overhead stream is cooled thereby separating two phases, a water phase and a butene-1 phase. The butene-1 phase is recycled to the fractionator and the water phase, now containing the aldehydes, is removed.

---

This invention relates to a method for removal of aldehyde from hydrocarbon streams containing aldehyde and water. In one aspect, this invention relates to the removal of impurities from a mixed liquid $C_4$ hydrocarbon stream.

The demand for high purity hydrocarbons has become increasingly important in the chemical industry. The removal of isobutylene from high purity butene-1 streams is of particular importance, and very difficult to accomplish. Separation by fractionation is not effective since the boiling point of the two components lie in a very narrow range and an unrealistic number of distillation trays would need be employed to separate the components. In the past a method has been employed for effecting such separation by selective absorption and polymerization of the isobutylene in sulfuric acid. However, such method of operation involves the use of large volumes of acid, extensive equipment, and high operating cost.

Various methods have been employed for removing isobutylene by selective polymerization from vaporous $C_4$ streams by utilizing various solid catalysts. However, at high temperatures butene-1 is also polymerized which decreases the production of this desired product.

In the copending application Ser. No. 618,575 of Godin, filed Feb. 27, 1967, a method is set forth wherein isobutylene can be removed from a liquid $C_4$ stream by contacting the stream with a silica-containing catalyst at a temperature from about 90–150° F. and at a pressure from 100 to 900 p.s.i.a. While effective separation has been effected by the method disclosed by Godin, problems have occurred in the poisoning of the silica-containing polymerization catalyst for the isobutylene removal zone. It is to be prevention of the poisoning of the silica-containing polymerization catalyst that the present invention is directed.

An object of this invention is to provide a method for preventing the poisoning of the silica-containing polymerization catalyst of an isobutylene removal zone in the production of high purity butene-1.

Other objects and advantages of the present invention will be apparent to those skilled in the art from a study of the drawing, the written disclosure and the appended claims.

According to the present invention a feed stream comprising butene-1, isobutylene, aldehydes, lighter hydrocarbons, and water is introduced into a fractionator wherein the feed stream is fractionated to provide an overhead product stream and a bottoms product stream. The bottoms products stream, a substantially dry and poison free mixture of butene-1 and isobutylene, can then be introduced into a polymerization zone for the removal of isobutylene over a silica-containing catalyst according to the process disclosed by Godin without deactivating the catalyst due to poisons contained in the feed stream.

The overhead product stream from the upper portion of the fractionator contains substantially all of the impurities such as aldehydes and water originally contained in the feed stream and some butene-1. Upon cooling, the overhead product stream separates into two phases and the butene-1 phase can be recycled to the fractionator and the impurities contained in the water phase can be discarded.

Referring to the drawing which is a schematic illustration of the process of the invention, a hydrocarbon feed stream comprising mixed $C_4$ hydrocarbons, a large portion of which is butene-1 and containing impurities such as butene-2, butadiene and isobutylene is fed to fractionator 11 via conduit 10. Fractionator 11 is maintained at a top temperature in the range of about 90–125° F., preferably about 110° F., a bottom temperature of about 150–200° F., preferably about 170° F., and at a pressure within the range of about 90–110 p.s.i.g., preferably about 100 p.s.i.g., so as to fractionate the feed stream into an overhead product stream and a bottoms product stream. The bottoms product stream comprising butene-2 and heavier components is removed from fractionator 11 via conduit 12.

The overhead stream produced in fractionator 11 is removed from fractionator 11 via conduit 13. The overhead stream is passed through condenser 14 and into accumulator 16. The overhead stream is removed from accumulator 16 via conduit 17 and a portion of the overhead stream is returned as reflux to fractionator 11 via conduit 18. The remainder of the overhead stream is passed through conduit 17 as feed into extractor 19.

A solvent, such as furfural or furfural and water, is introduced into extractor 19 via conduit 20. Extractor 19 is maintained at a pressure of about 70–100 p.s.i.g., preferably about 80 p.s.i.g., a top temperature in the range of 100–125° F., preferably about 110° F., and a bottom temperature in the range of about 300–350° F., preferably about 325° F. The furfural extract stream rich in butadiene is removed from extractor 19 via conduit 21 for conventional processing. The overhead vapor stream is removed from extractor 19 via conduit 22 and is passed through condenser 23 to accumulator 26 via conduit 24. Upon phase separation of the lighter hydrocarbon product in accumulator 26 the heavier furfural-water phase is removed via conduit 27. The hydrocarbon phase saturated with furfural and other aldehydes, such as acetaldehyde and propanal, and water is introduced into conduit 28 where the stream is divided, a portion being returned via conduit 29 as reflux to extractor 19, and the remaining portion of the hydrocarbon phase being passed through indirect heat exchanger 31. Heat exchanger 31 preheats the resulting hydrocarbon feed charged to fractionator 38 to a temperature within the range of about 100–130° F. The preheated hydrocarbon is passed via conduit 32 through heater 33 and rate of flow controlled valve 36 into the upper portion of fractionator 38. Fractionator 38 is maintained at a pressure within the range of about 50–75 p.s.i.g. and the overhead stream is at a temperature within the range of about 90–125° F., while the bottom product stream is within the range of about 100–150° F. Overhead vapors enriched in the furfural and water contaminants are removed via conduit 39, condensed in condenser 23, and passed into accumulator 26 via conduit 24 ultimately to be removed from accumulator 26 via conduit 27, while butene-1 in the overhead vapors is condensed and passes from accumulator 26 through line 28. Although furfural boils at 324° F., water at 212° F., butene-1 at 23° F., and isobutylene at 21° F., I have discovered that in fractionator 38, operating as described, furfural and water can be removed as an overhead stream and butene-1 and isobutylene recovered as a kettle product.

The purified hydrocarbon stream, lean in aldehydes, which apparently polymerize more readily than isobutylene, and water which are poisons for the subsequent polymerization process for the removal of isobutylene to produce a substantially pure butene-1, are passed from fractionator 38 via conduit 40, heat exchanger 31, wherein the purified hydrocarbon stream is cooled, into polymerization reactor 41 wherein the isobutylene impurity is polymerized over a silica-containing catalyst. The purified hydrocarbon stream is contacted with the silica-containing catalyst within reactor 41 which is maintained in the temperature range from about 90 to about 150° F., preferably from 90 to 100° F., and a pressure in the range of from about 100 to 900 p.s.i.a., preferably from 100 to 200 p.s.i.a. It has been found desirable that the purified hydrocarbon stream is run through reactor 41 at about 5 to 15 pounds of liquid hydrocarbon feed per pound of catalyst per hour.

The resulting stream containing the polymerized material is passed to fractionator 43 via conduit 42. Fractionator 43 is heated by any suitable means known in the art (not shown in the drawing), and refluxed with cooled liquid (not shown). Preferably, fractionator 43 is operated at about 90 p.s.i.a., and a bottom temperature of about 150° F. and a top temperature of about 100° F. Propane, isobutane, and some butene-1 are removed via conduit 44 in a vapor phase. A 99+ percent butene-1 stream is withdrawn via conduit 46. A heavy stream containing polymerized material is withdrawn via conduit 47 and passed to column polymer fractionator 48.

Polymer fractionator 48 is heated and refluxed in a similar manner as with fractionator 43 and is operated at about 350° F. and 70 p.s.i.a. at the bottom of the column and about 110° F. and 65 p.s.i.a. at the top of the column. A vaporous hydrocarbon stream is withdrawn from polymer fractionator 48 via conduit 51. The vaporous monomeric material from fractionator 48 is condensed in condenser 52 and then passed to accumulator 53. The liquid hydrocarbon stream is withdrawn from accumulator 53 via conduit 54. A portion of this liquid stream is recycled at a constant rate of flow as reflux to the upper portion of fractionator 48 via conduit 57 in response to the position of valve 56 which is in turn controlled by the rate of liquid flow through conduit 57.

The remainder of the liquid hydrocarbon stream removed via conduit 54 is passed through conduit 58 and removed as a light hydrocarbon product.

Bottoms product is removed from fractionator 48 via conduit 49. This produced polymer can be blended with gasoline, as desired.

Thus, it is readily seen that the present invention which comprises separating impurities such as aldehydes and water from the feed stream prior to entry into the catalytic polymerization zone as disclosed by Godin prevents ineffective operation and frequent shutdowns of the polymerization zone due to poisoning of the catalyst bed by impurities contained in the feed stream.

The following example is given to illustrate a typical impurities extraction from the feed stream prior to introduction into the polymerization zone for the removal of isobutylene by the process of this invention. However, it should be noted that the example is merely illustrative and in no way limits the present invention.

A feed stream 32 comprises a major portion of butene-1 and containing impurities of isobutylene, water, furfural, acetaldehyde and propanal, is fed into a fractionator at the rate of 4000 gallons per hour. Upon analysis of the feed stream the feed stream contains 99+ percent butene-1, isobutane, and isobutylene, 600 parts per million by weight water, and 25 parts per million by weight furfural, acetaldehyde and propanal. However, even the small amount of aldehydes and water present in the butene-1 rich stream contaminate the catalyst of the purification method shown by Godin and incorporated by reference herein. The fractionation column 38 is operated so as to maintain a pressure of about 60 p.s.i.g. and a temperature of about 112° F. on the upper portion of the fractionator and about 65 p.s.i.g. and a temperature of about 115° F. on the bottom portion of the fractionator. The feed introduced into fractionator 38 is heated to a temperature of about 100° F. Upon analysis the overhead product stream 39 based upon a rate of 500 gallons per hour or 12.5 percent of the feed per hour contained 4800 parts per million by weight water and 165 parts per million by weight furfural, acetaldehyde and propanal. The overhead also contained 99+ percent of $C_4$ hydrocarbons. As can readily be seen the water and aldehyde impurities are concentrated in the overhead product. The bottom product stream 40 consisting of 87.5 percent of the feed or 3500 gallons per hour contained only 3 parts per million by weight water and 5 parts per million by weight furfural, acetaldehydes, and propanal. Therefore, it is readily seen that the $C_4$ components of the bottom product stream are 99+ percent purity, and the product stream is essentially aldehydes-poison free and dry with respect to water.

In actual operation the fractionation of the feed stream prior to introduction into the polymerization zone 41 readily removed materials in the feed stream which poison the polymerization catalyst and hence prevent effective removal of isobutylene from the butene-1 stream. When butene-1 containing isobutylene impurity and the aldehyde contaminants was passed through polymerization reactor 41, under the same operating conditions, the aldehydes were polymerized by this catalyst and impaired the ability of the catalyst to economically polymerize isobutylene. The presence of poisons decreased the on-stream time of zone 41, requiring early shut down thereof and premature catalyst rejuvenation requirements as compared with the system of this invention.

I claim:
1. In a process for the production of substantially pure butene-1 from a feed stream comprising butene-1, isobutylene, aldehydes, and water by selectively polymerizing isobutylene in a polymerization zone, the improvement comprising:
  (a) introducing said feed stream into a fractionator upstream of said polymerization zone;
  (b) fractionating said feed stream to provide an overhead product stream containing said impurities and a portion of said butene-1 and a bottom product stream comprising butene-1 and isobutylene, said bottom product stream then being introduced into said polymerization zone to recover substantially pure butene-1.

2. A process according to claim 1 wherein said overhead product stream is separated into an aqueous phase and a butene-1 phase, withdrawing said butene-1 phase and recycling said butene-1 phase to said fractionator.

3. A process according to claim 1 wherein said fractionator is operated at conditions so as to provide a pressure of about 60 p.s.i.g. and a temperature of about 112° F. on the upper portion of said fractionator and about 65 p.s.i.g. and a temperature of about 115° F. on the bottom portion of said fractionator.

4. A process according to claim 1 wherein said feed stream is heated to a temperature of about 100° F. prior to introduction into said fractionation zone.

5. A process according to claim 1 to include the steps of:
  (a) introducing a mixture of hydrocarbons into a furfural extractor;
  (b) fractionating said feed stream to product a furfural extract stream rich in butadiene and an overhead vapor stream;
(c) withdrawing said overhead vapor stream and passing said vapor stream to a condenser;
(d) passing the condensed stream to an accumulator where the condensed stream separates into a heavier furfural-water phase and a hydrocarbon phase saturated with aldehyde and water;
(e) separating said hydrocarbon phase;
(f) introducing a portion of said hydrocarbon phase into a heat exchanger wherein the hydrocarbon phase is preheated prior to entry as said feed stream into said fractionator upstream of said polymerization zone; and
(g) introducing the other portion of said hydrocarbon phase into said furfural extractor as reflux.

6. A process according to claim 5 wherein said overhead stream from said fractionator is combined with said overhead vapor stream of said furfural extractor in said accumulator.

References Cited

UNITED STATES PATENTS

| | | | |
|---|---|---|---|
| 3,275,707 | 10/1966 | Bauer | 260—683.15 |
| 2,193,798 | 3/1940 | Atwell | 260—683.15 |

DELBERT E. GANTZ, *Primary Examiner.*

J. D. MYERS, *Assistant Examiner.*

U.S. Cl. X.R.

260—683.15